Patented Oct. 19, 1948

2,451,787

UNITED STATES PATENT OFFICE 2,451,787

POLYMERIZATION OF CHLOROPRENE

John Richard Vincent, Newport, Del., assignor to E. I. du Pont de Nemours & Company, Wilmington, Del., a corporation of Delaware No Drawing. Application March 29, 1946, Serial No. 658,209

4 Claims. (Cl. 260—92.7)

This invention relates to the polymerization of 2-chloro-1,3-butadiene, which will be referred to hereafter as chloroprene.

The objects of this invention are to provide a process for increasing the speed of polymerization of chloroprene in aqueous emulsions, particularly in the initial stages, by the use of a catalyst which permits greater control of the polymerization during the early and intermediate stages of the polymerization reaction and which may also be employed in accelerating the overall polymerization reaction.

The polymerization of chloroprene requires the presence of a catalyst in order to effect the polymerization in a reasonable period of time and to produce the desired yield of the polymer. Usually, catalysts of the peroxide type have been employed, such as potassium persulfate, ammonium persulfate, or hydrogen peroxide, either alone or in conjunction with potassium ferricyanide. There have been indications, however, that the presence of these relatively strong oxidizing agents in the finished polymer adversely affect the aging characteristics of the resulting elastomers. In many cases, the use of these peroxide type catalysts prevents the desired control of the polymerization, particularly in the initial and intermediate steps of the polymerization, and it has therefore been found desirable to employ a catalyst which will permit more effective control of the polymerization. As pointed out in U. S. Patents 2,227,518 and 2,227,519, certain desirable properties are imparted to the polymerized chloroprene if the polymerization is stopped at an intermediate stage. With the use of the ionic catalysts of the type above mentioned, the rate of polymerization of the chloroprene during the earlier and intermediate stages of the reaction is very rapid, and, consequently, it is very difficult, particularly in plant operation, to stop the polymerization at the desired point. If the amount of peroxide catalyst is reduced, an overall reduction in the rate of polymerization is usually experienced.

I have found that, by the use of esters of keto acids and dicarboxylic acids which contain from 5 to 19 carbon atoms in the ester molecule, the polymerization of the chloroprene in the initial stages can be materially accelerated and yet is relatively slow at the intermediate stages, so that it is much more readily controlled and brought to a stop than where the ionic catalysts of the type previously employed are used. Since these esters are non-ionic, the resulting latex contains a lower ion concentration than where the ionic type catalysts are employed, and the resulting polymer will not be adversely affected in its aging characteristics.

The initial stage of the polymerization may be made to proceed with comparative rapidity by the use of only 0.05% to 5% of the esters of the keto acids and dicarboxylic acids. The acceleration in the speed of the initial steps of the polymerization with the use of these esters is experienced even when used in conjunction with the peroxide type catalysts, so that, in those cases where the use of the peroxide catalysts is not undesirable, the carbonyl esters may be used in conjunction therewith. When both types of catalysts are used, the polymerization proceeds to a higher percentage conversion of the monomer to polymer before the rate of polymerization appreciably slows down. The use of the ester with the persulfate permits the amount of persulfate to be materially reduced, so that the advantages of improved stability and lower ion concentration are obtained.

The esters of the keto acids and dicarboxylic acids which may be used in carrying out the process of the present invention are particularly those which have from 8 to 19 carbon atoms in the molecule. These compounds all contain the nucleus:

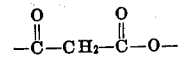

The methyl, ethyl, n-propyl, isopropyl, butyl, amyl, phenyl, tolyl, hexyl and cyclohexyl esters of aceto-acetic acid, of malonic acid, of acetone dicarboxylic acid, of benzoyl acetic acid, of propionyl acetic acid and of keto-succinic acid, are illustrations of those esters of keto-acetic acid and the esters of the dicarboxylic acids which include the nucleus above formulated and which may be employed in carrying out the present invention.

The following examples are given to illustrate some of the ways and some of the polymerization systems in which the catalysts of the present invention may be used. In these examples, the parts used are by weight, unless otherwise specified.

Example 1

Polymerizing chloroprene in emulsion with aceto-acetic ethyl ester as the catalyst, is illustrated by the following reactions, using:

| | Parts |
|---|---|
| Chloroprene | 100 |
| Sulfur | 0.7 |
| Nancy wood rosin | 4.0 |
| Stearic acid | 0.25 |
| Daxad-11[1] | 0.75 |
| Sodium hydroxide | 0.9 |
| Water | 158.0 |
| Aceto-acetic ethyl ester | 2.0 |

[1] The sodium salts of the dinaphthylmethane sulfonic acids obtained from naphthalene, sulfuric acid and formaldehyde, according to U. S. P. 1,336,759.

In this and succeeding examples, the rosin, sulfur, aceto-acetic ester, stearic acid, and other ingredients which are insoluble or slightly soluble in water, were dissolved in the chloroprene which was then emulsified by rapid agitation in the water containing the sodium hydroxide, potassium persulfate (when employed), and other water soluble ingredients.

When the above ingredients were mixed and emulsified, the temperature reached 40° C. in a few minutes without added heat. After 40 minutes at 40° C., the polymerization had proceeded to a yield of 47% and had slowed down considerably. After 65 minutes at 40° C., the yield was 54%, after 85 minutes it was 58%, and after 120 minutes it was 61%.

A similar polymerization, using 0.6% of potassium persulfate instead of the aceto-acetic ethyl ester, had to be heated to 40° C. to start the polymerization and was slow at first but reached a yield of 90% in 65 minutes. These two experiments show that aceto-acetic ester results in a very fast polymerization during the early stages, which slows down markedly as the polymerization proceeds.

A polymerization with aceto-acetic ethyl ester alone, as described above, was carried out to a yield of 55% after 80 minutes at 40° C. At the end of this period, 40 cc. of an aqueous solution containing 5% of potassium persulfate and 2.5% of potassium ferricyanide, was added. The polymerization was then continued at 40° C. to a yield of 95.5% in 195 minutes. This run illustrates one means of obtaining any desired yield in case the aceto-acetic ester alone does not carry the polymerization as far as is necessary.

*Example 2*

When potassium persulfate and aceto-acetic ethyl ester are used together to catalyze chloroprene polymerization, the first part of the reaction is very rapid, as shown by the data in the following table. The recipe used was the same as given in the table in Example 1, with the addition of 0.6 part of potassium persulfate. The control contained 0.6 part of potassium persulfate, and no aceto-acetic ethyl ester.

| Control | | Aceto-Acetic Ethyl Ester | |
|---|---|---|---|
| Polymerization Time | Yield | Polymerization Time | Yield |
| Minutes | Per cent | Minutes | Per cent |
| 35 | 45 | 45 | 85 |
| 60 | 73 | 60 | 92 |
| 95 | 91.5 | 70 | 94 |
| 120 | 96 | 80 | 95 |
|  |  | 90 | 96 |

*Example 3*

When the sulfur is omitted from the reaction mixture of Example 1, a polymerization catalyzed by only aceto-acetic ethyl ester (2 parts) proceeds more rapidly and to a higher yield than when sulfur is present. (Compare with Example 1.)

| Polymerization Time | Yield |
|---|---|
| Minutes | Per cent |
| 30 | 50 |
| 45 | 58 |
| 70 | 66 |
| 180 | 69 |

That the effect of aceto-acetic ethyl ester is not restricted to the system used in the preceding examples, can be seen from Examples 4 and 5.

*Example 4*

An emulsion polymerization system prepared in the manner described in Example 1, containing the following ingredients:

| | Parts |
|---|---|
| Chloroprene | 100.0 |
| Nancy wood rosin | 4.0 |
| Daxad-11 | 0.65 |
| Sulfur | 0.60 |
| Potassium persulfate | 0.52 |
| Sodium hydroxide | 0.70 |
| Water | 135.0 | and to which 0.4 part of potassium ferrocyanide was added as a 10% aqueous solution after the emulsion had been cooled to 10° C., was polymerized at 10° C. both with and without the addition of aceto-acetic ethyl ester. The following results were obtained:

| No Aceto-acetic Ethyl Ester | | 0.47 Part Aceto-acetic Ethyl Ester | |
|---|---|---|---|
| Polymerization Time | Yield | Polymerization Time | Yield |
| Minutes | Per cent | Minutes | Per cent |
| 3 | 11 | 6 | 15 |
| 33 | 12 | 36 | 27 |
| 63 | 23 | 66 | 40 |
| 93 | 31 | 96 | 54 |
| 123 | 53 | 124 | 64 |
| 147 | (¹) | 158 | 88 |
| 156 | 76 | 188 | 96 |
| 184 | ¹ 90 | 203 | 97 |
| 201 | 94 | 218 | 98 |
| 216 | 97 | | |
| 231 | 98 | | |

¹ An additional .09 part of potassium ferrocyanide as a 10% aqueous solution was added at this point.

The polymerization containing no aceto-acetic ethyl ester required almost 18% more ferrocyanide catalyst and 6% more time to reach a 98% yield than the one containing 0.47% of the ester. If a low yield polymer (for example, 53% to 54%) is desired, it is obtained in about 95 minutes with aceto-acetic ester, but requires about 125 minutes without it.

*Example 5*

An emulsion polymerization system prepared in the manner described in Example 1, containing the following ingredients:

| | Parts |
|---|---|
| Chloroprene | 100.0 |
| Nancy wood rosin | 4.0 |
| Iodoform | 0.25 |
| Daxad-11 | 0.65 |
| Potassium persulfate | 0.52 |
| Sodium hydroxide | 0.70 |
| Water | 135.0 | and to which 0.4 part of potassium ferrocyanide was added as a 10% aqueous solution after the emulsion had been cooled to 10° C., was polymerized at 10° C. both with and without the addition of aceto-acetic ethyl ester. The following results were obtained:

| No Aceto-acetic Ethyl Ester | | 0.47 Part Aceto-acetic Ethyl Ester | |
|---|---|---|---|
| Polymerization Time | Yield | Polymerization Time | Yield |
| Minutes | Per cent | Minutes | Per cent |
| 33 | 8 | 11 | 13 |
| 48 | 19 | 36 | 26 |
| 78 | 25 | 51 | 34 |
| 108 | 36 | 81 | 48 |
| 156 | ¹ 68 | 111 | ¹ 71 |
| 171 | 77 | 145 | ¹ 88 |
| 201 | ¹ 90 | 172 | 97 |
| 216 | 93 | 187 | 97 |
| 231 | 94 | 202 | 98 |
| 249 | 97 | | |
| 264 | 98 | | |

¹ An additional .09 part of potassium ferrocyanide as a 10% aqueous solution was added at this point.

The polymerization that was not catalyzed by aceto-acetic ethyl ester took 30% longer to reach a yield of 98% and took 45% longer to reach a yield of 70%.

*Example 6*

Diethyl malonate (2 parts) in the system of Example 1, to which 0.6 part of potassium persulfate was added, gave a 62% yield in 30 minutes and a 96% yield in 65 minutes, compared to 54% in 30 minutes and 96% in 95 minutes for a control containing no diethyl malonate.

*Example 7*

Diethyl acetone dicarboxylate (2 parts) in the system of Example 1, to which 0.6 part of potassium persulfate was added, gave a yield of 56% in 35 minutes compared to 49% for a control. The polymerization was slowed considerably in the later stages, requiring 160 minutes to produce a 96% yield, while the control required only 70 minutes.

While, in the above examples, the invention has been illustrated in connection with the emulsion polymerization of chloroprene alone, it is to be understood that the invention is also applicable in the polymerization of chloroprene mixed with minor amounts of other polymerizable compounds which are copolymerizable therewith, such as acrylonitrile, styrene, acrylic and methacrylic esters, etc., where such mixtures of polymerizable materials are polymerized by the methods normally employed in the polymerization of chloroprene itself.

This invention provides a means of improving the control of the rate of the emulsion polymerization of chloroprene.

As the only catalyst in the system, the use of the esters of the keto-acids and dicarboxylic acids provides an easy means of rapidly obtaining a low yield polymer, with the added advantage that the polymer is free from the undesirable effects of a peroxide type catalyst. A further advantage is the fact that the catalysts of this invention are non-ionic.

When used in conjunction with other catalysts, the catalysts of this invention provide a rapid polymerization during the early stages of the reaction, and, at 10° C., a more rapid over-all reaction.

I claim:

1. The process for effecting emulsion polymerization of chloroprene, which comprises incorporating in the emulsion prior to polymerization from 0.05% to 5.0%, based on the weight of the polymerizable material, of an ester of an organic acid of the class consisting of keto-acids and dicarboxylic acids which contain the grouping:

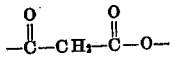

which esters contain from 5 to 19 carbon atoms in the molecule.

2. The process for effecting emulsion polymerization of chloroprene, which comprises incorporating in the emulsion prior to polymerization from 0.05% to 5.0%, based on the weight of the polymerizable material, of an alkyl ester of an organic acid of the class consisting of keto-acids and dicarboxylic acids which contain the grouping:

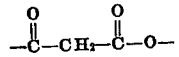

which alkyl esters contain from 5 to 19 carbon atoms in the molecule.

3. The process for effecting emulsion polymerization of chloroprene, which comprises incorporating in the emulsion prior to polymerization from 0.05% to 5.0%, based on the weight of the polymerizable material, of an ester of aceto-acetic acid.

4. The process for effecting emulsion polymerization of chloroprene, which comprises incorporating in the emulsion prior to polymerization from 0.5% to 5.0%, based on the weight of the polymerizable material, of the ethyl ester of aceto-acetic acid.

JOHN RICHARD VINCENT.

REFERENCES CITED

The following references are of record in the file of this patent:

UNITED STATES PATENTS

| Number | Name | Date |
|---|---|---|
| 2,380,474 | Stewart | July 31, 1941 |
| 2,388,373 | Stewart | Nov. 6, 1945 |